INVENTORS
JAMES F. BLACK
ABRAHAM R. LIBOFF
BY Theodore Jay Jr.
ATTORNEY 2,805,380

ELECTRICAL CONVERTER

James F. Black, Huntington Station, and Abraham R. Liboff, Levittown, N. Y., assignors to Sylvania Electric Products Inc., a corporation of Massachusetts Application September 28, 1956, Serial No. 612,754

6 Claims. (Cl. 321—45)

Our invention relates to electrical converters for transforming a unidirectional constant signal to a variable signal.

In the copending application of James F. Black, Serial No. 612,769, filed September 28, 1956, there is disclosed a novel continuously variable resistor utilizing an electrically anisotropic semiconductor body. We have invented a new type of electrical converter which employs this type of body.

Accordingly it is an object of the present invention to improve electrical converters through the use of electrically anisotropic semiconductor material.

Another object is to provide a new and improved electrical converter of the character indicated.

Still another object is to provide a new and improved electrical converter in which a constant unidirectional signal is transformed into a variable signal by continuously changing the value of a variable resistor at a selected frequency.

These and other objects of our invention will either be explained or will become apparent hereinafter.

As described in the above identified copending application, certain semiconductor materials as, for example, indium selenide, graphite, and antimony sulfide, are characterized by a crystalline structure of trigonal or rhombic symmetry composed of many well defined, parallel, closely packed planes of cleavage. When an electric current is passed through a body of such material in a direction perpendicular to these planes, the electrical resistivity of the body will be found to be relatively high and will represent maximum resistivity value for the body. Further, if a current is passed through the body in a direction parallel to these planes, the resistivity of the body will be found to be extremely low and will represent a minimum resistivity value. Moreover, if current is passed through the body at an angle with respect to the crystal planes which is other than 0° or 90°, the resistivity of the body will attain some value intermediate the maximum and minimum value. This variable resistivity property is defined as electrical anisotropy.

We employ a body of electrically anisotropic semiconductor material having first, second and third mutually perpendicular axes, the first axis being an axis of rotation, the second and third axes defining respectively lines of minimum and maximum electrical resistivity for the body. Hence, any other axis coplanar with the second and third axes defines a line of intermediate resistivity for this body.

First and second contactors are equidistantly spaced circumferentially about the body and are in electrical contact therewith. The contactors are so positioned as to define a line therebetween which intersects the first axis and which is coplanar with the second and third axes.

When the body is rotated about its first axis, therefore, the electrical resistivity of the body and the contactors, as measured between the contactors, varies continuously between maximum and minimum values.

In accordance with the principles of our invention, a continuously variable resistor of the type described above is connected in series with a load impedance and a source of a unidirectional constant signal as, for example, a constant voltage. When the electrically anisotropic semiconductor is rotated about its axis at a fixed frequency, an alternating output signal will appear across the load impedance, the signal frequency being equal to the fixed frequency.

An illustrative embodiment of our invention will now be described with reference to the accompanying drawing wherein.

Figure 1:
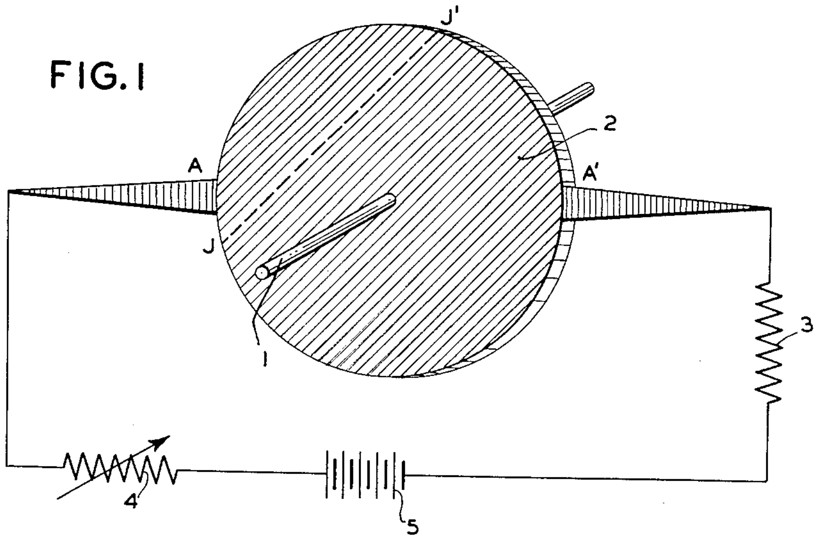
Fig. 1 is a schematic diagram of an electrical converter in accordance with our invention.

Referring now to Fig. 1, there is shown a battery 5 which produces a direct fixed voltage V. One end of the battery is connected through a load resistor 3 to a first contactor A'. The other end of the battery is connected through a conventional variable resistor 4 to a second contactor A. The two contactors are equidistantly spaced circumferentially about a disc 2 and make electrical contact therewith.

Disc 2 is composed of an electrically anisotropic semiconductor. The disc is rotatable about the axis of shaft 1 which extends through the center of the disc in a direction perpendicular to the surface of the disc. This body has a crystalline structure characterized by a plurality of closely packed, parallel planes of cleavage having a direction of orientation as indicated on the drawing. An imaginary line extending through the body in a direction parallel to the crystal planes and perpendicular to the shaft 2 defines a second axis which represents a line of minimum resistivity for the body. Similarly, another imaginary line extending through the body coplanar with the second axis and perpendicular both to the second axis and the shaft 2 defines a third axis which represents a line of maximum resistivity for the body. Further, an infinite number of additional imaginary lines can extend through the body and be coplanar with the second and third axes and perpendicular to the shaft. Each of these additional lines defines another axis which represents a line of intermediate resistivity for the body.

As body 1 is rotated about the axis of shaft 2, the resistance of the contactors and the body, as measured between the contactors, will vary continuously, the resistance having a minimum value when the second axis is aligned with the contactors and a maximum value when the third axis is aligned with the contactors.

The ratio between maximum and minimum resistivity values of the disc and contactors is high (for example, when the material is indium selenide, this ratio can be on the order of 100). Consequently, the circuit parameters can be adjusted so that the minimum resistance value is vanishingly small; i. e. essentially zero.

Under these conditions, if the maximum resistance of the contactors and disc has a value $R_2$ and the shaft is rotated at a constant angular frequency $w$, the resistance of the contactors and disc (which we define as $r$) is related to the maximum value $R_2$ in accordance with the formula $$r=R_2\ (1-\cos wt)$$

This expression presupposes, as is the case for the disc of Fig. 1, that a given incremental arc of rotation of the disc will cause a corresponding incremental change in resistance.

Figure 2:
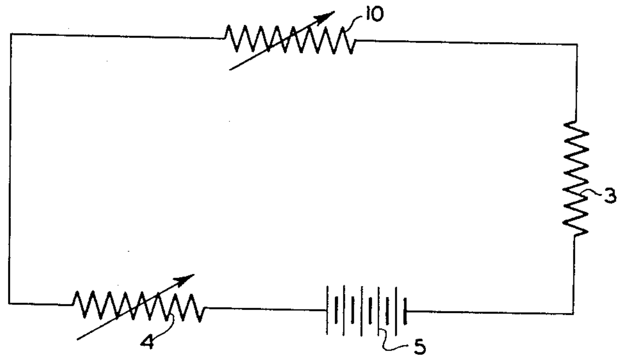
Fig. 2 is a schematic diagram of an equivalent circuit for the converter of Fig. 1.

An equivalent circuit for the converter of Fig. 1 is shown in Fig. 2, the variable resistor 10 representing the combination of the contactors and disc. The conventional variable resistor 4 is used to set an initial value of current for the circuit and is otherwise not a factor in the operation of the circuit.

The instantaneous current $i$ flowing in this circuit is therefore defined as $$i=\frac{V}{R+R_L+r}$$

where R is the set value of resistor 4 and $R_L$ is the value of the load resistor. (The $r$ and V terms have been previously defined.)

Since $$r=R_2(1-\cos wt)$$

$$i=\frac{V}{R+R_L+R_2(1-\cos wt)}$$

Now, if the sum $R+R_L+R_2$ is defined as equal to $R_1$, $$i=\frac{V}{R_1-R_2 \cos wt}$$

Since a current flows in the circuit, a voltage defined as $V_L$ appears across the load resistor. Voltage $V_L$ is the output voltage and is equal to the quantity $$V_L=i_LR=\frac{R_LV}{R_1-R_2 \cos wt}$$

Figure 3:
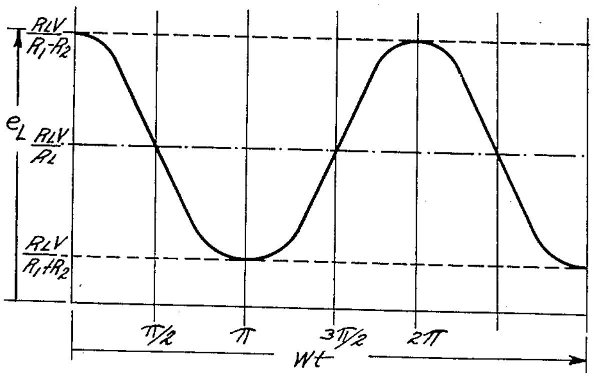
Fig. 3 is a plot of the waveform of the output signal produced by the converter of Fig. 1.

Hence, the output voltage is a variable signal which varies at a frequency $w$ (the angular velocity of rotation of the shaft 2). The waveform of this output voltage is shown in Fig. 3.

While we have shown and pointed out our invention as applied above, it will be apparent to those skilled in the art that many modifications can be made within the scope and sphere of our invention as defined in the claims which follow.

What is claimed as new is:

1. An electric converter comprising a load impedance, a variable resistor connected in series with said impedance, said resistor including an electrically anisotropic semiconductor body having first, second and third mutually perpendicular axes, said first axis being an axis of rotation for said body, said second and third axes respectively defining lines of maximum and minimum electrical resistivity for said body; a pair of contactors equidistantly spaced circumferentially about said body; means to apply a constant unidirectional signal across the series connection of said impedance and said resistor; and means to rotate said body about said first axis at a constant frequency, a variable output signal of the same frequency appearing across said load impedance.

2. A converter as set forth in claim 1, wherein said minimum resistivity is essentially zero.

3. An electric converter comprising a load impedance, a variable resistor connected in series with said impedance, said resistor including an electrically anisotropic semiconductor body having first, second and third mutually perpendicular axes, said first axis being an axis of rotation for said body, said second and third axes respectively defining lines of maximum and minimum electrical resistivity for said body; a pair of contactors equidistantly spaced circumferentially about said body; means to apply a constant unidirectional signal across the series connection of said impedance and said resistor; and means to rotate said body about said first axis at a constant frequency, a variable current of the same frequency flowing through said series connection.

4. In combination with a source of a unidirectional constant signal, a series circuit connected across said source, said circuit including a load impedance, an electrically anisotropic semiconductor body having first, second and third mutually perpendicular axes, said first axis being an axis of rotation for said body, said second and third axes respectively defining lines of maximum and minimum electrical resistivity for said body, a pair of contactors equidistantly spaced circumferentially about said body, the positions of said contactors defining a line which intersects said first axis and which is coplanar with said second and third axes; and means to rotate said body about said first axis at a fixed frequency, an alternating current of the same frequency flowing through said series circuit.

5. An electrical converter comprising a load impedance; first and second separated coplanar contactors, said first contactor being coupled to one end of said impedance; an anisotropic semiconductor body interposed between and in electrical contact with said contactors, said contactors being equidistantly spaced apart from each other, said body being rotatable about a first axis perpendicular to the plane of said contactors, said body having second and third mutually perpendicular axes which are perpendicular to said first axis and coincident with said plane, said second and third axes respectively defining lines of maximum and minimum resistivity for said body; and means to apply a constant unidirectional voltage between the other end of said impedance and said second contactor.

6. A converter as set forth in claim 5, wherein said minimum resistivity is essentially zero, said converter further including means to rotate said body about said first axis at a fixed frequency.

References Cited in the file of this patent

UNITED STATES PATENTS 2,025,123 Rahbek ---------------- Dec. 24, 1935